Patented Oct. 31, 1939

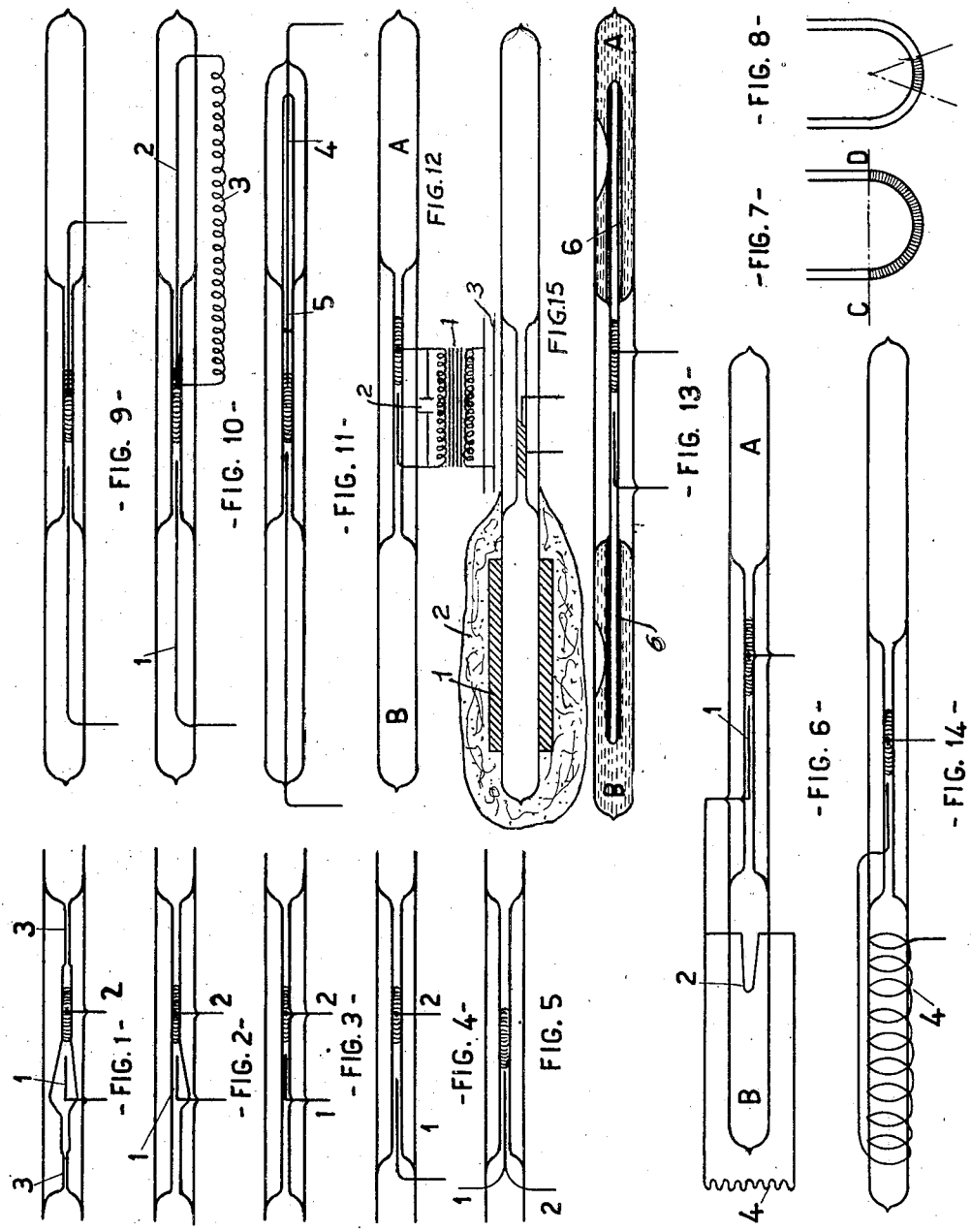

2,178,487

UNITED STATES PATENT OFFICE 2,178,487

DEVICE FOR SIGNALING THE PRESENCE OF ILLUMINATING GAS IN INHABITED PREMISES

Giuseppe Menozzi, Messina, Italy

Application December 3, 1937, Serial No. 177,876
In Italy December 12, 1936

7 Claims. (Cl. 200—52)

It is among the objects of this invention to provide a very sensitive means for signaling the presence of illuminating gas.

A more detailed object is to provide a signaling means of the preceding character which is exceptionally durable and able to withstand vibrations and shocks without materially affecting the sensitivity of such means.

It is a still further object of the invention to provide a signaling means for illuminating gas which includes a mercury tube that may rest in any desired position and still function. Stated more in detail, the tube of my invention comprises a rectilinear chamber which may extend horizontally or vertically as distinguished from the prior art in which the mercury is contained in a U-tube which must be maintained in a single definite position.

To the accomplishment of the foregoing and related ends, said invention, then, consists of the means hereinafter fully described and particularly pointed out in the claims; the annexed drawing and the following description setting forth in detail certain mechanism constituting, however, but one of various applications of the principles of my invention.

In the accompanying drawing:

Fig. 1 is a diagrammatic view of an embodiment of the invention in which the capillary tube is uniformly enlarged.

Fig. 2 is a diagrammatic view of a modification of Fig. 1.

Fig. 3 is another modification of Fig. 1.
Fig. 4 is another modification of Fig. 1.
Fig. 5 is another modification of Fig. 1.
Fig. 6 is another modification of Fig. 1.
Fig. 7 is a detail view.
Fig. 8 is a detail view.
Fig. 9 is a modification of Fig. 1.
Fig. 10 is a modification of Fig. 1.
Fig. 11 is a modification of Fig. 1.
Fig. 12 is a modification of Fig. 1.
Fig. 13 is a modification of Fig. 1.
Fig. 14 is a modification of Fig. 1.
Fig. 15 is a modification of Fig. 1.

In my prior application filed on the 29th of August 1936, Serial No. 98,613, a patent has been applied for with respect to a device for signaling the presence of illuminating gas in inhabited premises, constituted essentially of a catalizer, coupled with a gas differential thermometer with electric contacts and an electric warning circuit.

In the present patent application, modifications and additions have been made to the above device which improve its sensitiveness and the certainty of its functioning even in the case of the smallest escapes of illuminating gas.

The device described in the preceding application proves in practice to be of a very limited sensitiveness due above all to the fact that the very few degrees of temperature supplied by the platinum sponge in the case of escapes of illuminating gas in inhabited premises, which in ordinary escapes amount to 3 or 4 degrees, are not sufficient, owing to the great compressibility of the gas, to give the necessary force of expansion to the gas in the heated bulb. An expanding force is required to overcome the resultant of the forces which oppose the movement of the mercury which are due to friction of the walls along the capillary tube and to surface pressures working on the meniscuses of the mercury during its motion.

In order to obtain a greater degree of sensitiveness in the gas differential thermometer for a determined value of the pressure of the gas in the two bulbs and for a determined value of the volume of the bulbs themselves, it is necessary to reduce to a minimum all the forces which oppose the motion of the mercury in the capillary tube, amongst which, are two forces just mentioned.

To overcome these forces a slight conical shape is formed in the capillary tube so that the meniscus of the mercury destined to come into contact with platinum wire 1 passes, during its motion, from a restricted section to an enlarged section (Figs. 1 and 2); thus an easier and quicker flow of the mercury in the desired direction is obtained. The return of the mercury to its initial position, when there is no longer any illuminating gas about, is obtained by the device described hereinafter.

If it is desired to eliminate the aforesaid conical shape, it is necessary that the section of the capillary be perfectly cylindrical, because if it was of an irregular shape, it might present a conical surface, however slight, in an opposite direction to that described above, thus obstructing the motion of the mercury.

A capillary tube of uniform cross section can be used by the following arrangements: see Figs. 3, 4 and 5. In Figs. 3 and 4, wire 1 is extended into the interior of the capillary tube beyond the point where the tube is deformed due to the soldering of the wire itself.

In Fig. 5 the two wires are introduced into the capillary tube both from the same end and with their extremities on the same plane. Also here the two wires extend into the capillary tube beyond a point where the tube is deformed by the joining with the bulbs.

The rectilinear capillary tube mentioned in the preceding patent application is more sensitive than the U-shaped capillary tube used hitherto in preceding patents. But, if in the same U-shaped capillary tube the drop of mercury is reduced so that the surface of the two meniscuses are not tangent to the same horizontal plane CD, as in Fig. 7, but to almost vertical planes as in Fig. 8, the degree of sensitiveness increases, and it increases more as the said planes get nearer to the vertical position.

It often happens that once the closing of the electric warning circuit in the presence of illuminating gas has been obtained through the device previously described, the very weak forces acting on the drop of mercury in approximately its equilibrium position are not sufficient, when the gas disappears, to produce the detachment of the mercury from platinum wire 1, neither during the passage of the current, nor after the voluntary interruption of the electric circuit.

In order to eliminate this inconvenience modifications have been introduced into the device whereby the automatic interruption of the circuit is obtained when the illuminating gas is absent. These modifications consist in the use of the heat produced by the current in the platinum wires enveloping, or passing through, the bulbs of the thermometer. This may be accomplished in various manners:

(a) By giving to platinum wire 1 in the interior of the capillary tube (Figs. 1, 2, 3, 4 and 5) an adequate length and section, the heat produced by the current in the wire itself will be sufficient to bring the mercury back into its initial position when the illuminating gas is no longer present;

(b) By giving to wires 1 and 2 destined to close the circuit different lengths and sections so as to create a thermic dissymetry. A practical realization of this may have different forms, among which is the one represented by Fig. 6;

(c) By disposing two wires on the same side of the capillary as shown in Fig. 5;

(d) By disposing platinum wire 4 (Fig. 14) wound around one of the bulbs.

(e) By disposing the platinum wires as per Fig. 6: platinum wire 1 is in metallic connection with platinum wire 2, whose essential function is to ensure the automatic detachment of the mercury from platinum wire 1 (and, therefore, the interruption of the alarm circuit) when there is no longer any illuminating gas in the premises.

When, in consequence of the heating of bulb A, the mercury comes into contact with platinum wire 1, causing the making of the alarm circuit, an electric current is formed through platinum wire 2, which, being of a very small diameter, properly chosen, gets heated and consequently causes the heating of the gas in bulb B. Therefore the detachment of the drop of mercury from platinum wire 1 occurs, but this detachment is only a temporary one because under the action of the illuminating gas, bulb A wrapped in a catalyser, always maintaining a temperature above that of the premises, urges once more the mercury to contact with wire 1, when the temperature of bulb B, in consequence of the momentary interruption of the circuit, has reverted to the temperature of the room, and so on until no illuminating gas is present in the premises. Thus one obtains the intermittent closing of the alarm circuit while the illuminating gas is present, and the automatic interruption of the electric circuit when the gas has disappeared.

The working of automatic instruments such as an alarm bell, gas valve, house lights etc. may be insured by appropriate relays even from the first closing of the circuit.

The intermittent state may, if so desired, be eliminated by regulating, through the resistance 4 of the derived circuit (Fig. 6), the current passing through platinum wires 2, so that the heat produced in it by the current will be just sufficient to cause the detachment of the mercury when bulb A returns to normal temperature in consequence of the disappearance of the gas.

Fig. 10 shows that even when platinum wires 1 and 2 are of equal length and section one can obtain an automatic interruption of the electric circuit creating a thermic dissymetry between the two bulbs, by adding a resistance 3. Wrapping one of the two bulbs in an insulating substance, and bad conductor of heat, such as glass, rubber, etc. may also secure the same result.

An improvement applicable to all forms of gas differential thermometers is obtained by bringing the gas in the two bulbs A and B to a pressure above the atmospheric one, which permits of the differential thermometer being arranged so that the closing of the circuit is insured even with the smallest differences of temperature between the two bulbs, thus obtaining signaling upon the slightest escape of gas.

In fact the increase of the gas pressure in the two bulbs, due to the rise of temperature in one of the two bulbs, is $$p=\frac{1}{2}\frac{t}{273}P$$

i. e., it is proportionate to the initial pressure P. Consequently, by giving to the volume of the bulbs an adequate value in relation to the section of the capillary tube, and an appropriate value to pressure P of the gas in the two bulbs, it is possible to obtain for a gas differential thermometer, any degree of sensitiveness.

The greater pressure of the gas in the two bulbs, with respect to that of the atmosphere, facilitates the automatic detachment of the mercury from platinum wire 1 when the presence of illuminating gas ceases, and it has further the advantage of limiting the movements of the drop of mercury in the capillary tube in consequence of shocks, or of abrupt displacements.

The super-sensitiveness given to the differential thermometer by the superpressure of the gas in the two bulbs, with respect to that of the atmosphere, insures the working of the device even when the capillary tube of the differential thermometer, which in the present device is preferably rectilineary disposed is placed in a vertical position.

This certainty of functioning, which is not sufficiently secured when the gas in the bulbs is at ordinary pressure, avoids, in a positive manner, any inopportune closing of the alarm circuit (in view of the very small forces at play) due to the trembling of the wall on which the apparatus is placed, or to that of the apparatus itself.

A further improvement applicable also to all the forms of differential thermometers consists in wrapping the catalyser 1 with cotton-wool, glass-wool, common wool, silk, feathers, or the like as shown at 2 in Fig. 15. This wrapping, which is of extraordinary importance in the present invention, has the object of increasing notably the temperature of the said catalyser, and, therefore it increases considerably the sensitiveness of the device. In fact, as the said wrapping is penetrated by the hydrogen with great facility, the catalyser contained therein, as a consequence of the above reaction, increases its temperature compared with that of the premises,—which temperature is almost entirely preserved because the wrapping itself prevents the dispersion of heat which occurs, in the absence of the wrapping, owing to the convective currents of the air around the catalyser produced by its own heating.

Experiments made with such a wrapping have given the following results: temperatures reached by the platinum sponge in a room of the size of ml. 4 x 4 x 3 of height, with an external window closed and internal door open:

1. With gas escaping from three kitchen furnaces and discharging each 300 litres per hour:
   (a) Without wrapping, 4 degrees;
   (b) With wrapping, 11 degrees.
2. With gas escaping from a furnace discharging 300 litres per hour:
   (a) Without wrapping, 1½ or about 2 degrees;
   (b) With wrapping, 7 degrees.
3. With a very small amount of gas escaping corresponding to about 60 litres per hour:
   (a) Without wrapping, no temperature, or a fraction of a degree;
   (b) With wrapping, from 1 to 2 degrees.

For the purpose of rendering the thermometer insensible to the variation of the temperature of the room, the bulb opposite the one wrapped up in the catalyser is also covered with cotton-wool, glass-wool, common wool, etc.

When using the above wrapping, one can also successively use differential thermometers with bulbs A and B (Fig. 13), filed almost completely with liquid at low boiling temperature (for instance, ether), so that the pressure existing in the bulbs is that of steam saturated at the temperature of the room. The working of this thermometer is based on the fact that the maximum tension of the saturated steam varies quite closely with the variation of the temperature, as can be easily seen from the tables of physical constants.

For the purpose of avoiding the evaporation of the mercury in consequence of the sparks generated by the alternating current in the interruption of the circuit, which causes the inconveniences that the mercury steam depositing on the wall of the capillary tube increases the friction in relation to the motion of the mercury in the capillary tube, thus preventing the safe working of the device, the use of a transformer 1 of alternating current is introduced to diminish the tension of the street current 3, as well as of a condenser 2 of appropriate capacity to eliminate the spark (see Fig. 12), or an A. C. rectifier is resorted to.

The rectifier, or the transformer and condenser system above referred to are preferably used because the sparks produced on interruption of the circuit fed direct by the alternating current at ordinary tension (the same as used for private illumination) cause in time the blackening (as has been ascertained in practice) of the contact point of the platinum wire; which blackening causes an appreciable resistance of the circuit and prevents the working of the apparatus.

The notable sensitiveness conferred to the differential thermometer by the improvements introduced requires an absolute insensibility to the variations of the temperature of the premises of the whole thermometer, and it is, therefore necessary to have recourse to special measures in order to prevent variations of temperature, however slight, that may occur between the two bulbs as a consequence of variations of the temperature of the premises, or of currents of hot or cold air attacking with preference one or other of the bulbs. For that purpose, the thermometer must offer a perfect thermic symmetry in relation to the two bulbs. Such symmetry is obtained:

1. By covering the two bulbs with substances having the same thermionic conductiveness (as in my prior application);
2. By wrapping up the whole thermometer with cotton-wool, common wool, silk, cloth, etc. to prevent a sharp variation in the temperature of the two bulbs due to external causes;
3. By protecting with a small net the whole differential thermometer, for the purpose of preventing, or reducing, differences of temperature which might occur between the two bulbs owing to currents of hot or cold air.

The narrowings obtained by reducing diameter 3 of the capillary tube (Fig. 1), or by obstacles 5 placed at the inlet of the capillary (Fig. 11) are meant to prevent the exit of the mercury from the capillary in consequence of abrupt movements.

Extensions 6 (Fig. 13) of the capillary tube in bulbs A and B have also the object of preventing, in consequence of shocks, or abrupt movements, or upsetting of the differential thermometer, that the mercury of the capillary tube is projected into the bulbs, or that the steam bubbles, in the differential thermometer with bulbs full of liquid at a low temperature of ebullition, may penetrate into the capillary tube.

By covering the bulb with the catalyser in direct contact, and for thermic balance also covering the opposite one, with a thin layer of a good conductor of heat (such as silver), one obtains an equitable distribution of the heat supplied by the catalyser over the whole surface of the bulb with an appreciable increase in the promptness of the thermometer.

What I claim and desire to secure by Letters Patent is:

1. A device for indicating the presence of illuminating gas, comprising two bulbs connected by a capillary tube, one of said bulbs having a catalytic substance in contact therewith, said substance having a covering of insulating material directly contacting same.

2. A device for indicating the presence of illuminating gas, comprising two bulbs connected by a capillary tube, said tube containing mercury and current conducting wires, one of said wires being in contact with said mercury and the other being spaced from said mercury under normal conditions, said other wire having a length sufficient to generate an appreciable amount of heat when it contacts said mercury.

3. A device for indicating the presence of illuminating gas, comprising two bulbs connected by a capillary tube, said tube containing mercury and current conducting wires, one of said wires being in contact with said mercury and the other being spaced from said mercury under normal conditions, said other wire having a length sufficient to generate an appreciable amount of heat when it contacts said mercury, and having a resistance connected thereto.

4. A device for indicating the presence of illuminating gas, comprising two bulbs connected by a capillary tube, said tube containing mercury and current conducting wires, one of said wires being in contact with said mercury and the other being spaced from said mercury under normal conditions, said first named wire being covered with insulating material.

5. A device for indicating the presence of illuminating gas comprising two bulbs connected by a capillary tube, one of said bulbs having a catalytic substance in contact therewith, said capillary tube containing mercury and extending rectilinearly.

6. A device for indicating the presence of illuminating gas comprising two bulbs connected by a capillary tube, one of said bulbs having a catalytic substance in contact therewith, said capillary tube containing mercury and extending rectilinearly, that portion of said tube containing said mercury normally being cylindrical and an adjacent portion thereof having a conical shape.

7. A device for indicating the presence of illuminating gas comprising two bulbs connected by a capillary tube, one of said bulbs having a catalytic substance in contact therewith, said capillary tube containing mercury and extending rectilinearly, said bulbs being filled with a gas at superatmospheric pressure.

GIUSEPPE MENOZZI.